(12) United States Patent
Gammell et al.

(10) Patent No.: US 8,424,169 B2
(45) Date of Patent: Apr. 23, 2013

(54) CORD LOCK ASSEMBLY

(75) Inventors: Robert A. Gammell, Fernie (CA); Scott D. Kolasa, Mount Prospect, IL (US)

(73) Assignee: Illinois Tool Works Inc., Glenview, IL (US)

( * ) Notice: Subject to any disclaimer, the term of this patent is extended or adjusted under 35 U.S.C. 154(b) by 426 days.

(21) Appl. No.: 12/669,234

(22) PCT Filed: Jul. 8, 2008

(86) PCT No.: PCT/US2008/069421
§ 371 (c)(1),
(2), (4) Date: Jun. 1, 2010

(87) PCT Pub. No.: WO2009/012081
PCT Pub. Date: Jan. 22, 2009

(65) Prior Publication Data
US 2010/0257701 A1    Oct. 14, 2010

Related U.S. Application Data

(60) Provisional application No. 60/959,769, filed on Jul. 17, 2007.

(51) Int. Cl.
*F16G 11/00* (2006.01)
*F16G 11/10* (2006.01)

(52) U.S. Cl.
USPC .................................................. 24/115 G

(58) Field of Classification Search ............ 24/115 G
See application file for complete search history.

(56) References Cited

U.S. PATENT DOCUMENTS

| 1,061,809 | A | * | 5/1913 | Bocorselski et al. ......... 439/817 |
| 1,874,828 | A | * | 8/1932 | Suss ............................. 337/197 |
| 2,307,808 | A | * | 1/1943 | Segal ........................... 24/600.6 |
| 3,604,069 | A | * | 9/1971 | Jensen ........................... 24/332 |

(Continued)

FOREIGN PATENT DOCUMENTS

| EP | 0193696 | 9/1986 |
| FR | 2760177 A1 | 9/1998 |

(Continued)

OTHER PUBLICATIONS

ISR for PCT/US2008/069421 mailed Nov. 5, 2008.

(Continued)

*Primary Examiner* — Robert J Sandy
*Assistant Examiner* — Louis Mercado
(74) *Attorney, Agent, or Firm* — Mark W. Croll; Paul F. Donovan

(57) ABSTRACT

A cord lock assembly is configured to selectively tighten and loosen a draw cord of an article. The cord lock assembly may include a shell, a piston and a spring member. The shell defines an interior chamber and includes aligned shell cord passages. The piston is slidably retained within the interior chamber. The piston includes a piston cord passage formed therethrough. The spring member exerts a force into the piston within the shell so that the piston cord passage is misaligned with respect to the shell cord passages in a locked position. A cord may be operatively secured to the piston and may be configured to be pulled to move the piston to align the piston cord passage with the shell cord passages in an unlocked position so that a draw cord may freely pass therethrough.

29 Claims, 6 Drawing Sheets

U.S. PATENT DOCUMENTS

| | | | | |
|---|---|---|---|---|
| 4,328,605 | A | * | 5/1982 | Hutchison et al. ............ 24/115 G |
| 4,453,292 | A | * | 6/1984 | Bakker ........................ 24/115 G |
| 4,724,584 | A | * | 2/1988 | Kasai ........................... 24/115 G |
| 4,878,269 | A | * | 11/1989 | Anscher et al. .............. 24/115 G |
| 5,156,430 | A | * | 10/1992 | Mori ............................ 294/82.23 |
| 5,197,166 | A | * | 3/1993 | Meier et al. .................. 24/115 G |
| 5,315,741 | A | * | 5/1994 | Dubberke .................... 24/712.1 |
| 5,323,514 | A | * | 6/1994 | Masuda et al. ............... 24/115 G |
| 5,345,657 | A | | 9/1994 | Shimizu |
| 5,361,461 | A | * | 11/1994 | Anscher ....................... 24/115 G |
| 5,649,340 | A | | 7/1997 | Ida |
| 7,257,865 | B2 | | 8/2007 | Kaneko et al. |

FOREIGN PATENT DOCUMENTS

| | | |
|---|---|---|
| GB | 883050 | 11/1961 |
| JP | 2-52608 U | 4/1990 |
| JP | 2005-000231 A | 1/2005 |
| KR | 10-2004-0105559 A | 12/2004 |
| WO | 9830815 A1 | 7/1998 |

OTHER PUBLICATIONS

KR Office Action, dated Oct. 29, 2012, issued in KR Application No. 20-2010-7000001.

* cited by examiner

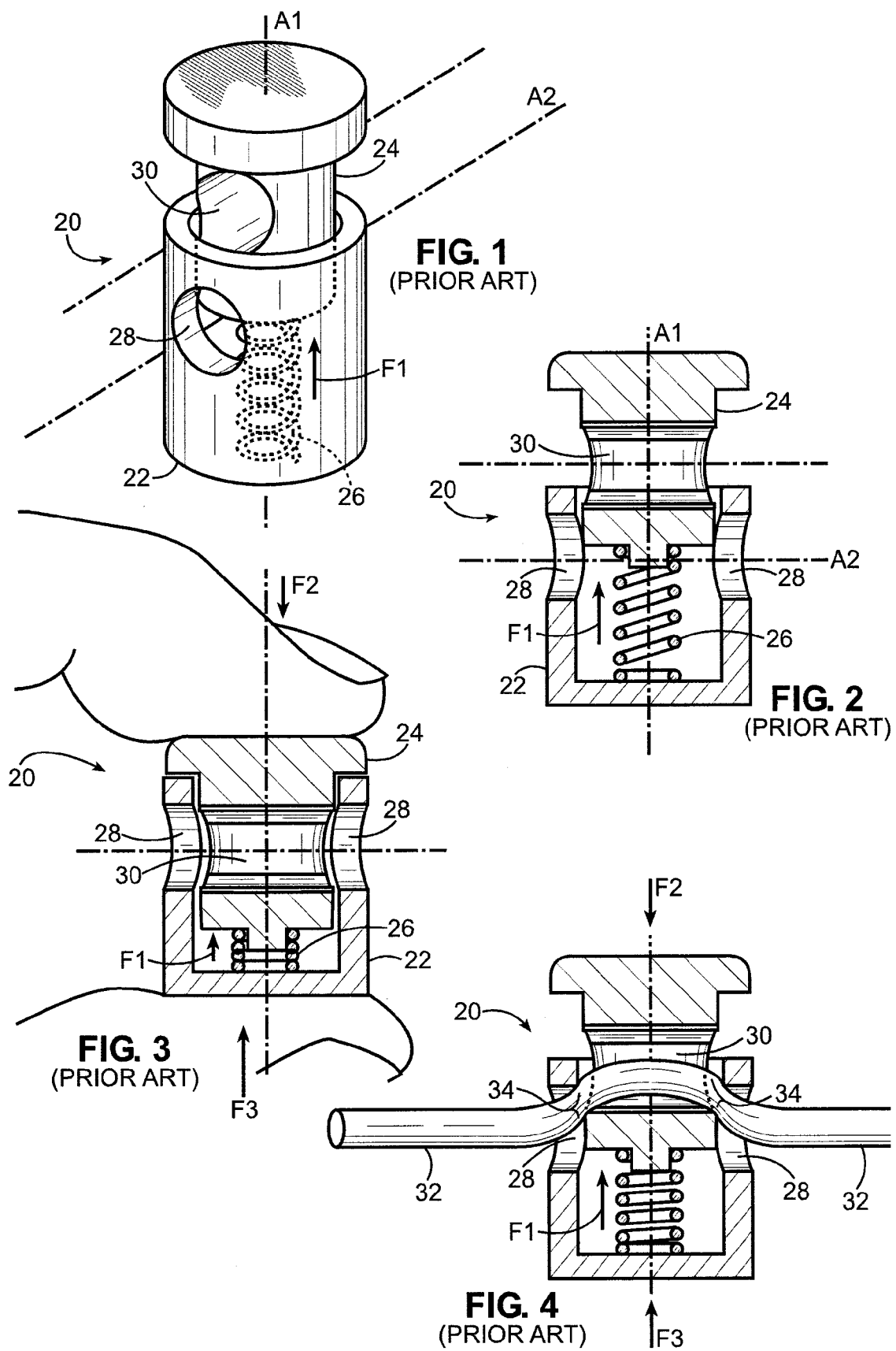

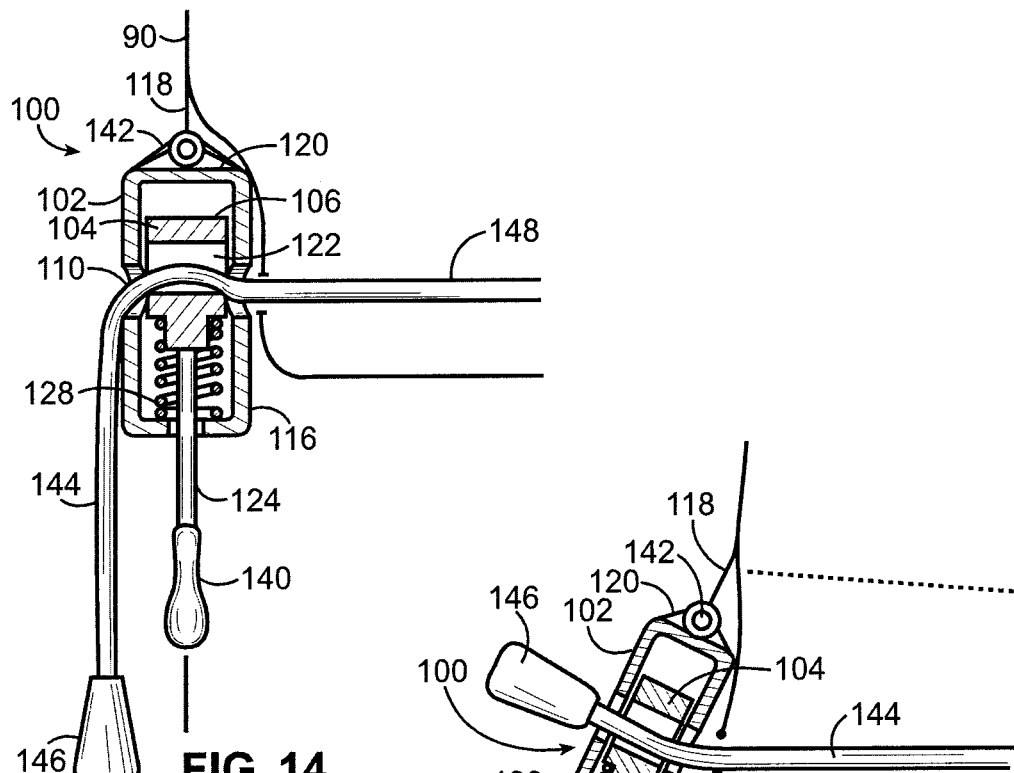
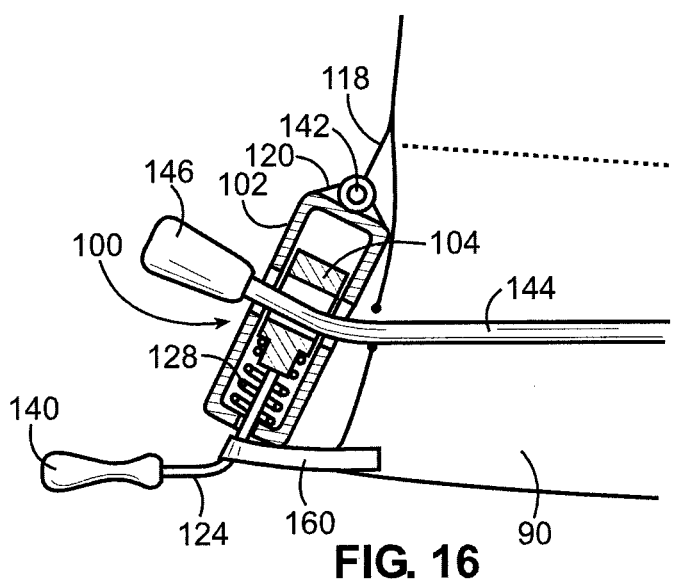
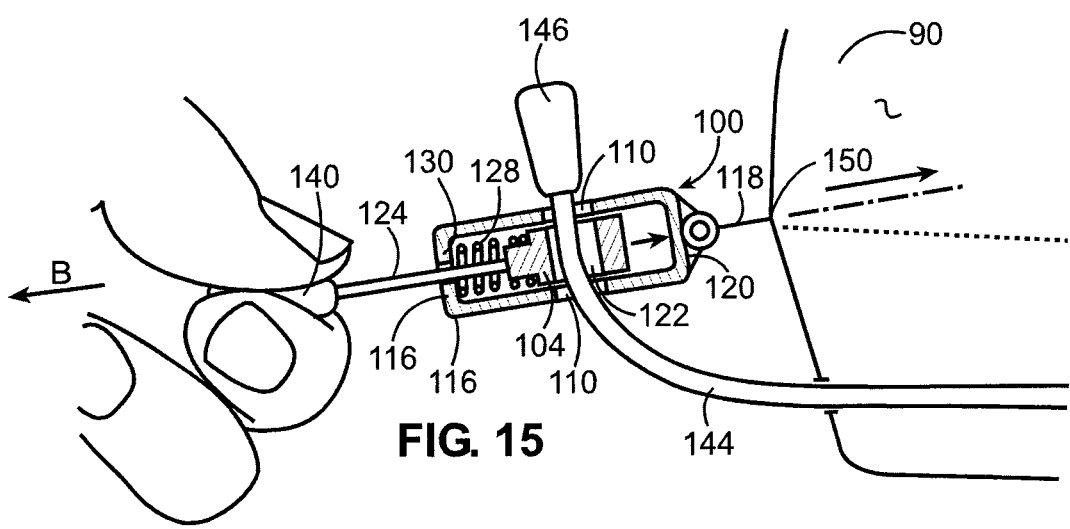

CORD LOCK ASSEMBLY

RELATED APPLICATIONS

The present application is national phase of PCT/US2008/069421 filed Jul. 8, 2008, and claims priority from U.S. Application No. 60/959,769 filed Jul. 17, 2007, the disclosures of which are hereby incorporated by reference herein in their entirety.

FIELD OF THE INVENTION

Embodiments of the present invention generally relate to draw cords that may be used with outdoor clothing and accessories, and more particularly to an improved cord lock that may be operated with one hand to tighten and loosen draw cords.

BACKGROUND OF THE INVENTION

Typical draw cords are contained in a textile tube or channel that encircles an opening. When the draw cord is pulled tight through an exit hole of the channel, the draw cord collapses the channel to close the opening completely, as with a bag opening. The closing is typically just close enough to seal out elements, as with the cuff of a glove or an equipment cover, while allowing adjustment to fit, as with a waist area of a pair of pants.

Various cord locks are used to adjust draw cords. One type of cord lock is a flat or wheel cord lock that includes a flat, tapered socket. Two ends of a draw cord run through the sockets and are releasably locked in place with a toothed wedge or wheel. Another type of cord lock pinches a cord or cords between two or more slidably misaligned cord passages.

FIG. 1 illustrates an isometric partial internal view of a conventional cord lock 20. FIG. 2 illustrates an axial cross-sectional view of the conventional cord lock 20. The cord lock 20 may be a barrel cord lock. Referring to FIGS. 1 and 2, the cord lock 20 may be molded of rigid plastic and includes a hollow cylindrical shell 22 that is open at one end to receive an internal piston 24 that is configured to slide within the shell 22. The piston 24 has a limited range of travel along shell axis A1. A stainless steel compression coil spring 26 is disposed between the piston 24 and the closed end of the shell 22 along axis A1. The shell 22 defines two diametrically opposed cord passages 28 disposed along an axis A2 that is perpendicular to axis A1. The piston 24 also defines a cord passage 30 that is parallel to axis A2, but is misaligned by a biasing force F1 of the spring 26.

FIG. 3 illustrates an axial cross-sectional view of the conventional cord lock 20 in a compressed state in which the cord passages 28 and 30 are aligned. FIG. 4 illustrates an axial cross-sectional view of the conventional cord lock 20 retaining a draw cord 32. Referring to FIGS. 3 and 4, when the piston 24 is forced into the shell 22 against the biasing force F1 of the spring 26, such as when a user squeezes the piston 24 and the shell 22 together between a forefinger F2 and a thumb F3, the cord passage 30 is aligned with the cord passages 28. Thus, the draw cord 32 may be threaded through cord passages 28 and 30, and the location of the cord lock 20 may be adjusted on the draw cord 32. When the forces F2 and F3 are released, the biasing force F1 exerted by the spring 26 pushes the piston 24 up, thereby misaligning the cord passages 28 and 30 so that proximate edges 34 of opposing cord passages 28 and 30 pinch the draw cord 32. As such, the cord lock 20 may be locked at a particular location on the draw cord 32.

FIG. 5 illustrates an isometric view of a conventional bow cord lock 40. FIG. 6 illustrates a transverse cross-sectional view of the conventional bow cord lock 40. Referring to FIGS. 5 and 6, the cord lock 40 is typically molded of semi-resilient plastic and includes an outer ring 42 in the shape of two bows integrally formed together at the ends with two thicker opposing straight sides 44 defining integrally formed and slidably offset cord passages 46 that are parallel to axis A2. Spring beams 48 are thinner connected ends that bias, with force F1, cord passages 46 into misalignment along axis A1 to pinch the draw cord 32 at pinching edges 50. Forces F2 and F3 are applied along access A1 against force F1 to squeeze the sides 44 together, align the cord passages 46 and release the pinch on draw cord 32.

The cord locks described above are generally configured to be operated with two hands. To tighten an opening, an operator squeezes the cord lock with one hand in order to release the pinch on the draw cord, while holding the end of the draw cord with another hand. The user may then slide the cord lock along the draw cord up against the draw cord channel exit hole while pulling the draw cord through the cord lock to collapse the channel. Then the cord lock is allowed to pinch the draw cord in the desired position. To loosen, the operator squeezes the cord lock with one hand, and slides it out to the end of the draw cord, while using both hands to spread the opening, thereby pulling the draw cord back into the channel.

In general, the cord lock and the draw cord system are able to seal out elements in many outdoor clothing and accessory applications. In the case of using the system to seal the cuffs of gauntlet style gloves or mitts, where only one hand is available for adjustment, using the teeth to pull the draw cord tight is typically awkward. Thus, some cord locks are configured for one hand operation. In this case, the cord lock is anchored to a garment or article to be adjusted. The anchor keeps the cord lock close to the draw cord exit hole of the channel. To tighten, only one hand is used to pull the draw cord through the cord lock, and to loosen only one hand is used to squeeze the cord lock to release the pinch on the draw cord. Then, while still, squeezing, to pull the cord lock outwards to spread the opening.

FIG. 7 illustrates an axial cross-sectional view of the conventional cord lock 20. A hole 52 is typically formed in the closed, spring end of the shell 22. An anchor lanyard 54 is secured within the hole.

FIG. 8 illustrates an isometric view of the conventional cord lock 20 being anchored. Elastic webbing 56 is positioned over portions of the cord passages 28 of the cord lock 20. FIGS. 9 and 10 illustrate conventional cord locks. These cord locks include single or double anchor loops 58 integrally incorporated into the shell of a regular cord lock.

The anchoring systems and methods discussed above allow one hand operation of the cord lock. Typically, when tightening an opening with the anchored cord locks discussed above, the draw cord is pulled with enough power to overcome the full pinching force of the cord lock. This takes effort, prematurely wears the draw cord, wears the cord passage pinching edges, overstretches the shock cord when used and stresses the anchor points. To loosen an opening, the cord lock is squeezed to release the pinch on the draw cord, then held and pulled outward to spread the opening. Squeezing the draw cord between the tips of the thumb and the forefinger makes it more difficult to keep a good grip when pulling outward at the same time. Such an operation is also not easy to perform while wearing gloves or mittens, particularly if they are heavily insulated. Although some cord locks include defined gripper squeezing surfaces, these surfaces are typically large and obtrusive. As such, they are susceptible to impact damage and entanglement with various other items exterior to the cord lock.

SUMMARY OF THE INVENTION

Embodiments of the present invention provide a cord lock assembly that may be operated with one hand. Embodiments of the present invention provide a cord lock assembly that reduces the pinching force of the cord lock on the draw cord during tightening, and provides a release mechanism that releases the pinch on the draw cord and spreads the opening during loosening. Further, embodiments of the present invention provide a cord lock assembly that may have a compact, rounded shape that is easy to feel, grip, grasp and manipulate even while wearing gloves or mittens.

Certain embodiments of the present invention provide a cord lock assembly configured to selectively tighten and loosen a draw cord of an article. The cord lock assembly may include a shell, a piston and a spring member.

The shell defines an interior chamber, said shell comprising aligned shell cord passages, which may be holes, semicircular open channels, grooves or the like. The piston is slidably retained within the interior chamber and includes a piston cord passage formed therethrough.

The spring member exerts a force into the piston within said shell so that the piston cord passage is misaligned with respect to the shell cord passages in a locked position. The shell is configured to be pulled with respect to said piston, or vice versa, to align the piston cord passage with the shell cord passages in an unlocked position so that a draw cord may freely pass therethrough. That is, the shell is pulled relative to the piston in order to align the passages.

Certain embodiments of the present invention provide an assembly in which either the shell or the piston is configured to be directly grasped and manipulated. In this way, the shell may be pulled with respect to the piston, or vice versa.

Certain embodiments of the present invention provide a cord lock assembly configured to selectively tighten and loosen a draw cord of an article, such as a glove opening, waistband, bag/sack opening or the like. The cord lock assembly includes a shell defining an interior chamber. The shell includes aligned shell cord passages. The circumference (or circumferential envelope) of the shell may be shaped as an oval.

The cord lock assembly also includes a piston slidably retained within the interior chamber of the shell. The piston may include a piston cord passage formed therethrough. The cross-section (or cross-sectional envelope) of the piston may also be shaped as an oval. The oval shape of the piston with the oval shell ensures that the piston does not rotate within the shell. Also, the oval shape provides strength to the cord lock assembly.

The cord lock assembly may also include a spring member that exerts a force into the piston within the shell so that the piston cord passage is misaligned with respect to the shell cord passages in a locked position.

A cord is operatively secured to the piston. The cord is configured to be pulled to move the piston to align the piston cord passage with the shell cord passages in an unlocked position so that a draw cord may freely pass therethrough. A distal end of the cord may be connected to a distinct grip tab that is discernable through touch. That is, a user may readily identify the cord through the distinct size and shape of the grip tab, even if the user cannot see the grip tab.

The cord lock assembly may be configured such that grasping the cord with one hand moves the piston cord passage and the shell cord passages into the unlocked position.

An end cap may be snapably secured to the shell. In this case, the piston is trapped between the shell and the end cap. Further, the end cap may include an opening through which the cord passes.

The shell of the cord lock assembly may include first and second open ends. A flexible lanyard may be anchored over one of the first and second open ends. The flexible lanyard may limit the movement of the piston (e.g., prevent the piston from ejecting from the shell), while at the same time assisting in aligning the passages when the cord is pulled.

At least one anchor may be configured to securely retain a portion of material that is secured to the article. The anchor(s) may be aligned over at least one of the shell cord passages.

The spring member may bias the piston into a closed end of the shell in the locked position. Optionally, the spring member may suspend the piston within the interior chamber in the locked position.

BRIEF DESCRIPTION OF SEVERAL VIEWS OF THE DRAWINGS

FIG. 1 illustrates an isometric partial internal view of a conventional cord lock.

FIG. 2 illustrates an axial cross-sectional view of a conventional cord lock.

FIG. 3 illustrates an axial cross-sectional view of a conventional cord lock in a compressed state in which cord passages are aligned.

FIG. 4 illustrates an axial cross-sectional view of a conventional cord lock retaining a draw cord.

FIG. 14 illustrates an axial cross-sectional view of a cord lock assembly secured to an article, according to an embodiment of the present invention.

FIG. 15 illustrates an axial cross-sectional view of a cord lock assembly being manipulated into an open position, according to an embodiment of the present invention.

FIG. 16 illustrates an axial cross-sectional view of a cord lock assembly secured to an article, according to an embodiment of the present invention.

Figure 5:
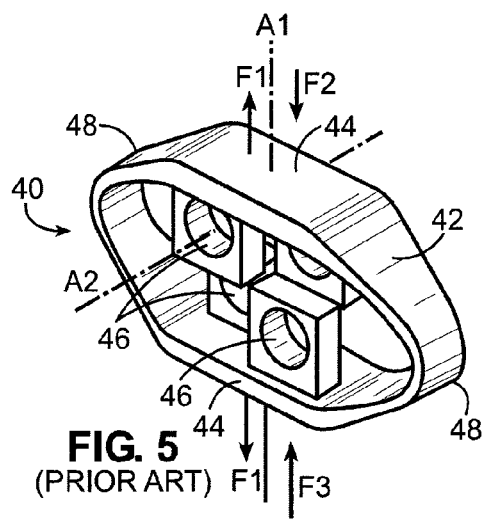
FIG. 5 illustrates an isometric view of a conventional bow cord lock.
Figure 6:
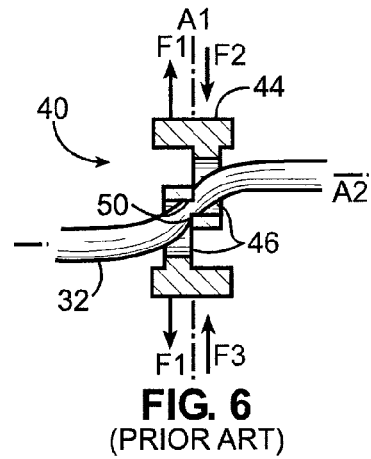
FIG. 6 illustrates a transverse cross-sectional view of a conventional bow cord lock.
Figure 7:
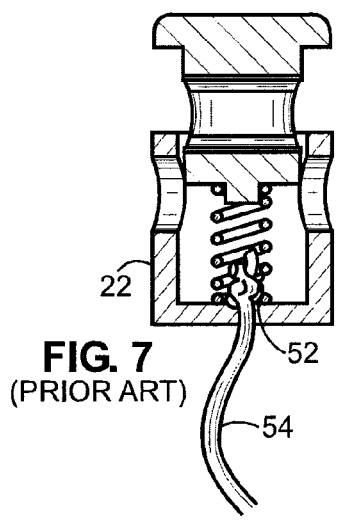
FIG. 7 illustrates an axial cross-sectional view of a conventional cord lock having an anchor attached thereto.
Figure 8:
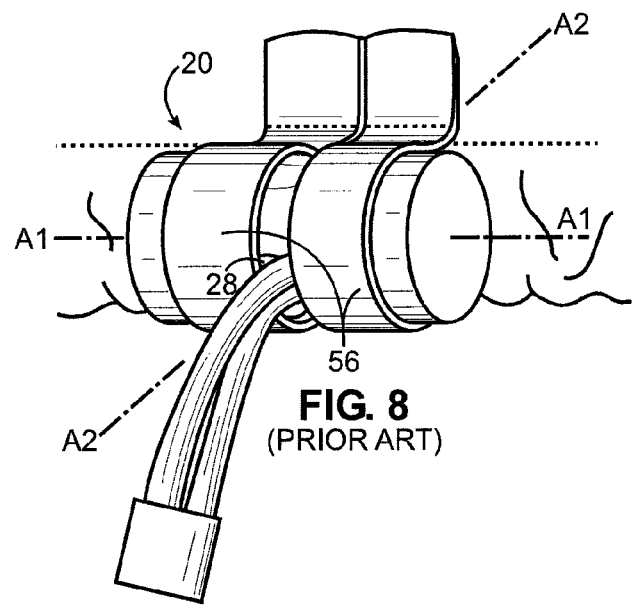
FIG. 8 illustrates an isometric view of a conventional cord lock being anchored.
Figure 9:
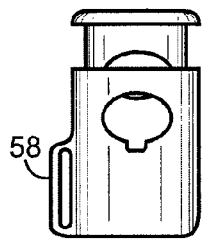
FIG. 9 illustrates a conventional cord having an anchoring loop.
Figure 10:
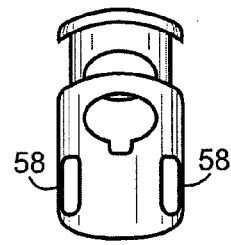
FIG. 10 illustrates a conventional cord lock having multiple anchoring loops.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

Figure 11:
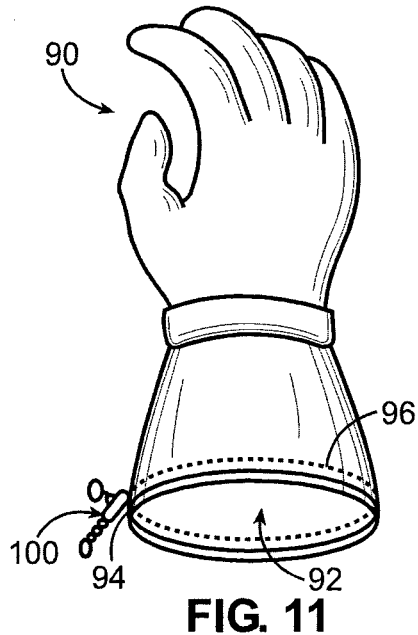
FIG. 11 illustrates an isometric view of an article, such as a glove, having a cord lock assembly that is configured to selectively expand and tighten an opening of the glove, according to an embodiment of the present invention.

FIG. 11 illustrates an isometric view of a glove 90 having a cord lock assembly 100 that is configured to selectively expand and tighten an opening 92 of a cuff of the glove 90, according to an embodiment of the present invention. The opening 92 allows a wearer to insert his/her hand into the glove 90. A draw cord 94 is positioned within a channel 96 of the cuff of the glove 90 proximate the opening 82. A portion of the draw cord 94 is also retained within the cord lock assembly 100. While the cord lock assembly 100 is shown used with the glove 90, the cord lock assembly 100 may be used with various other items that are configured to be selectively expanded and tightened around an object (such as a waistband of shorts or pants, bags/sacks or the like).

Figure 12:
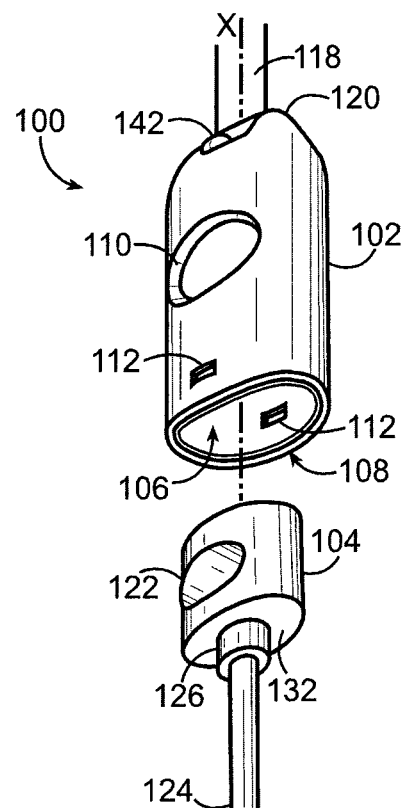
FIG. 12 illustrates an isometric exploded view of a cord lock assembly, according to an embodiment of the present invention.

FIG. 12 illustrates an isometric exploded view of the cord lock assembly 100, according to an embodiment of the present invention. The cord lock assembly 100 may be molded of a rigid plastic, such as acetal, or any other suitable material that is able to withstand severe environmental conditions.

The cord lock assembly 100 includes a main housing or shell 102 that slidably retains a piston 104. The piston 104 may include a generally oval cross-section (about a central longitudinal axis X). The oval shape of the piston 104 prevents the piston 104 from rotating within the similarly-shaped shell 102. It has been found that this cross-sectional shape provides a strong, robust and compact cord lock assembly 100 having a low profile.

The shell 102 defines an interior chamber 106 having an open end 108. Aligned cord passages 110 are formed through the shell 102 and are generally perpendicular to a longitudinal axis X of the cord lock assembly 100. Slots 112 are formed through the shell 102 proximate the open end 108 and are configured to receive and snapably retain tabs 114 of an end cap 116. A lanyard 118, such as a strip of polyester webbing, is secured to an end 120 of the shell 102 that is distally located from the open end 108. The lanyard 118 securely connects the cord lock assembly 100 to an article, such as a cuff of the glove 90 (shown in FIG. 11) through an anchor 142. The anchors 142 may include rollers or pulleys to reduce friction with the lanyard 118.

The piston 104 is configured to be slidably retained within the interior chamber 106 of the shell 102. The piston 104 includes a cord passage 122 that passes through the piston 104 and is generally perpendicular to the longitudinal axis X of the cord lock assembly 100. A cord 124 extends from an end 126 of the piston 104 that is distally located from the anchor 142.

A coil spring 128 is compressively sandwiched between a base 130 of the end cap 116 and a bottom surface 132 of the piston 104. The coil spring 128 is configured to bias the piston 104 toward the end 120 of the shell 102 so that the cord passage 122 is not aligned with the cord passages 110. A central channel 134 is defined through the spring 128. The cord 124 passes through the central channel 134 and out through an opening 136 formed through the base 130 of the end cap 116. A distal end 138 of the cord 124 is secured to a grip tab 140 that is positioned outside of the end cap 116. As shown in FIG. 12, the grip tab 140 is ergonomically shaped such that it tapers toward the end cap 116. This allows a user to easily grip the grip tab 140 with two fingers. The grip tab 140 may also include ribs, ridges or the like extending from outer gripping surfaces that reduce the risk of fingers slipping off the grip tab 140. The grip tab 140 is operable to be grasped so that a user may pull the cord 124 through the opening 136, thereby compressing the spring 128 and moving the cord passage 122 into alignment with the cord passages 110. The grip tab 140 is large and distinctive so that it may easily be identified by a user simply through touch, even if the user is wearing gloves.

In this embodiment, the piston 104 is trapped within the interior chamber 106 by the shell 102 and the end cap 116. The piston 104 is blocked from ejecting from the shell 102 by the closed end 120 of the shell 102.

Figure 13:
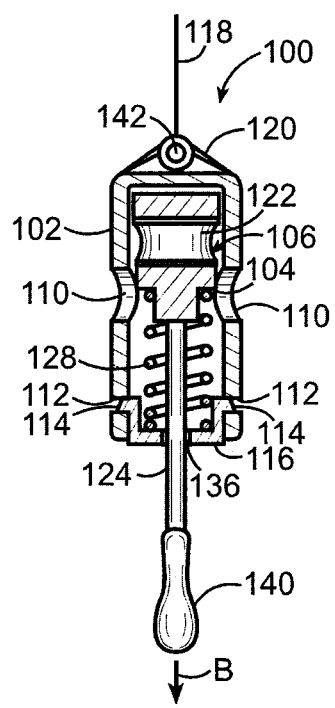
FIG. 13 illustrates an axial cross-sectional view of a cord lock assembly, according to an embodiment of the present invention.

FIG. 13 illustrates an axial cross-sectional view of the cord lock assembly 100. As mentioned above, the coil spring 128 biases the piston 104 into the end 120 of the shell 102. While the piston 104 may slide within the internal chamber 106, the range of motion of the piston 104 is limited by the end 120 of the shell 102 and the base 130 of the end cap 116. When the piston 104 is biased into the end 120 of the shell 102, the cord passage 122 is misaligned with the aligned cord passages 110 of the shell 102. In order to align the cord passage 122 with the cord passages 110, a user grasps the grip tab 140 and pulls down in the direction of arrow B.

The lanyard 118, as noted above, which may be a strip of polyester webbing, may be securely looped around a securing rod, post or other such anchor 142 positioned at the end 120 of the shell 102. Thus, the lanyard 118 is securely attached to the shell 102.

FIG. 14 illustrates an axial cross-sectional view of the cord lock assembly 100 secured to an article 90, such as the glove shown in FIG. 11, according to an embodiment of the present invention. As shown in FIG. 14, the lanyard 118 securely fastens the shell 102 of the cord lock assembly 100 to the article 90.

A draw cord 144 having a grip tab 146 at a distal end is slidably retained within a channel 148 of the article 90. The grip tab 146 may be sized and shaped differently than the grip tab 140 so that it is readily distinguishable from the grip tab 140. Thus, a user may discern, simply through touch, which cord 124 or 144 he/she is manipulating.

A portion of the draw cord 144 passes through the cord passages 110 of the shell 102 and the cord passage 122 of the piston 104. The spring 128 biases the piston 104 toward the end 120 of the shell 102, thereby ensuring that the cord passage 122 of the piston 104 is not aligned with the cord passages 110 of the shell 102. Thus, the portion of the draw cord 144 within the internal chamber 106 is pinched between edges of the shell 102 that define the cord passages 110 and surfaces of the piston 102 that define the cord passage 122. In this manner, the draw cord 144 is locked in position. Because the cord lock assembly 100 is securely fastened to the article 90, a user may pull the cord 124 down in order to move the piston 104 within the shell 102 (which is secured to the article 90 through the lanyard 118) such that the cord passage 122 aligns with the cord passages 110.

FIG. 15 illustrates an axial cross-sectional view of the cord lock assembly 100 being manipulated in an open position, according to an embodiment of the present invention. When a user grasps the grip tab 140, the cord lock assembly 100 pivots toward the user about the point or area 150 where the lanyard 118 secures to the article 90. The user then pulls the cord 124 in the direction of arrow B, which, in turn, pulls the piston 104 in the same direction. The spring 128 compresses as the piston 104 moves toward the base 130 of the end cap 116. When the cord passage 122 of the piston 104 aligns with the cord passages 110 of the shell 102, the pivoting nature of the cord lock assembly 100 with respect to the article 90 allows the draw cord 144 to slide through the channel defined between the aligned passages 122 and 110. In this manner, the draw cord 144 may be loosened to allow the opening of the article 90 to expand. Further, this movement may be accomplished with one hand.

When the user releases the grip tab 140, the spring 128 biases the piston 104 back toward the end 120 of the shell 102. Thus, the cord passage 122 of the piston 104 misaligns with the cord passages 110 of the shell 102, thereby pinching the draw cord 144 into a locked position.

In order to tighten the draw cord 144 to cinch, or otherwise tighten, the opening of the article 90, the user first grasps the grip tab 146 and pulls away from the cord lock assembly 100. Some of the friction exerted at the points where the cord 144 is pinched within the interior chamber 106 is transferred directly to the piston 104 when the cord 144 is pulled. The friction is transferred into the piston in the direction of arrow B, thereby slightly moving the piston 104 toward the end cap 116. Thus, the cord passage 122 slightly moves toward the cord passages 110, thereby alleviating some of the pinching force on the cord 144. This reduces the amount of force needed to pull the cord 144 through the cord lock assembly 100. As such, the cord 144 may be constrictively slid through the cord lock assembly 100. That is, the cord 144 slides, in a constricted fashion, within the cord lock assembly 100 while the cord 144 remains pinched therein. When the user releases the grip tab 146, the cord 144 is locked into place. Thus, the user may overcome at least some of the locking force exerted by the cord lock assembly 100 by pulling on the grip tab 146. However, when the user releases the grip tab 146, the pinching force exerted by the cord lock assembly 100 ensures that the cord 144 is locked in place.

FIG. 16 illustrates an axial cross-sectional view of the cord lock assembly 100 secured to the article 90, according to an embodiment of the present invention. In this embodiment, a securing loop 160 may be looped around the cord 124 and secured to the article 90. Thus, the securing loop 160 limits the range of pivot of the cord lock assembly 100 with respect to the article 90. Further, the securing loop 160 ensures that the cord lock assembly 100 remains within a consistent area with respect to the article 90. In this manner, the securing loop 160 cooperates with the cord lock assembly 100 to ensure that when the cord 124 is pulled, it will completely expand an opening of the article 90. Optionally, the securing loop 160 may be secured around the shell 102.

Figure 17:
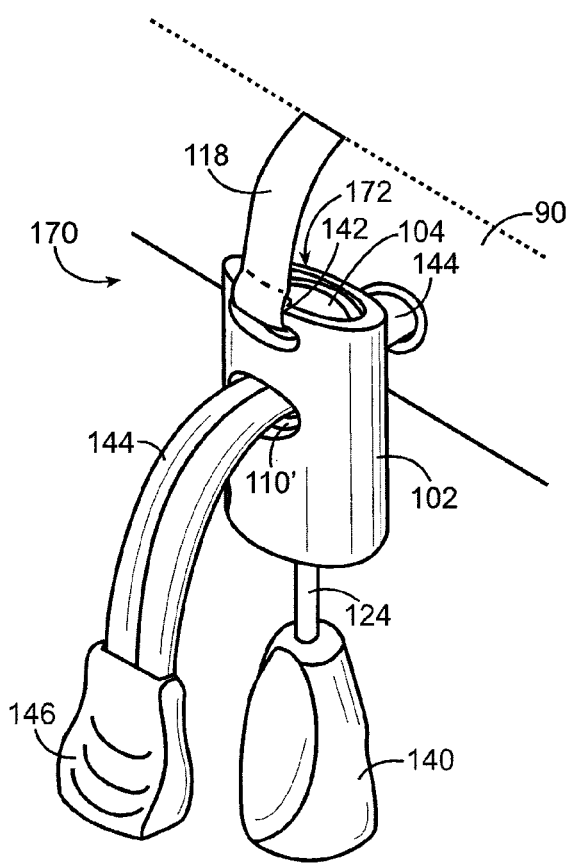
FIG. 17 illustrates an isometric view of a cord lock assembly secured to an article, according to an embodiment of the present invention.
Figure 18:
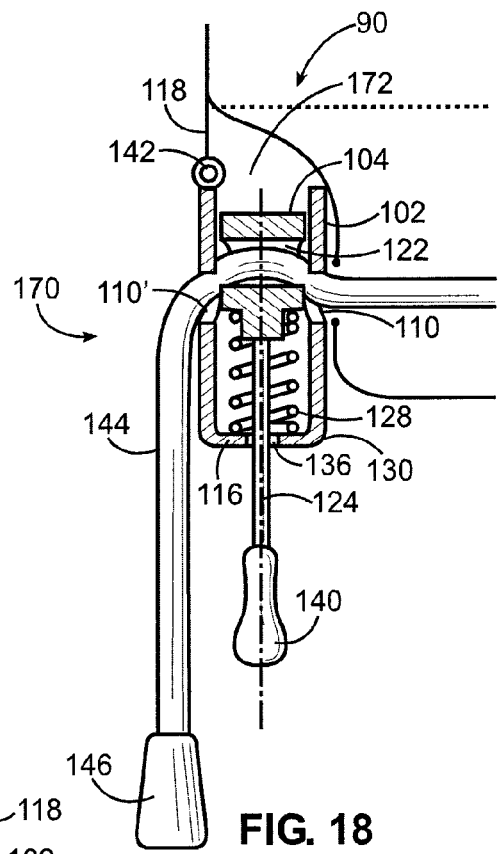
FIG. 18 illustrates an axial cross-sectional view of a cord lock assembly, according to an embodiment of the present invention.

FIG. 17 illustrates an isometric view of a cord lock assembly 170 secured to the article 90, according to an embodiment of the present invention. FIG. 18 illustrates an axial cross-sectional view of the cord lock assembly 170, according to an embodiment of the present invention. Referring to FIGS. 17 and 18, the shell 102 includes an open end 172. The piston 104 is prevented from ejecting through the open end 172 because the opening 136 in the base 130 of the end cap 116 is smaller than the diameter of the grip tab 140.

The lanyard 118 is connected to an outside edge of the open end 172 and is generally in line with the outer cord passage 110'. The anchor 142 may be an upper edge of the shell 102 defined by a slot through which a portion of the lanyard 118 passes. It has been found that the alignment of the lanyard 118, anchor 142 and the cord passage 110' provide an efficient system for translating motion of the cord 144 through the cord lock assembly 170 and also for moving the piston 104 within the shell 102 through the cord 124. Thus, the cord lock assembly 100 provides a simple construction with an efficient anchor 142 and lanyard 118 location that is generally in line with the pull of the draw cord 144.

In this embodiment, the piston 104 may be secured to an end of the spring 128, which in turn may be secured to the end cap 116. For example, portions of the spring 128 may be bonded, glued or otherwise fastened to the piston 104. Thus, the spring 128 is prevented from ejecting from the shell 102. Further, the lanyard and/or the article 90 may act as a barrier that prevent the piston 104 from ejecting from the shell 102.

Figure 19:
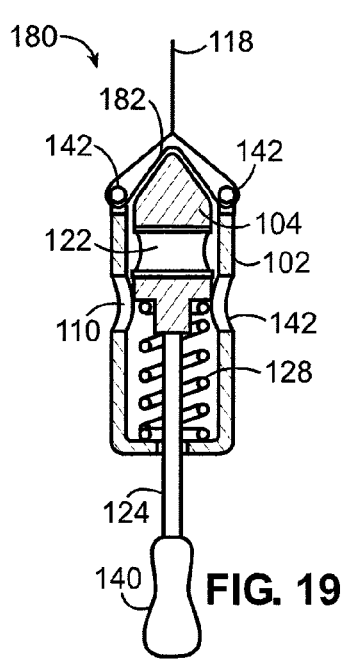
FIG. 19 illustrates an axial cross-sectional view of a cord lock assembly, according to an embodiment of the present invention.

FIG. 19 illustrates an axial cross-sectional view of a cord lock 180 assembly, according to an embodiment of the present invention. In this embodiment, opposing anchors 142 are located approximately 180° apart from one another. The lanyard 118 is looped around both anchors 142, thereby providing a more robust connection of the shell 102 to the lanyard 118. When biased toward the lanyard 118, the piston 104 pushes the lower portion 182 of the lanyard up. Nevertheless, the lanyard 182 limits the motion of the piston 104.

Figure 20:
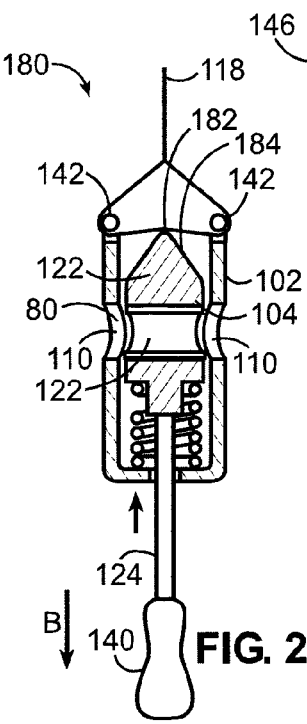
FIG. 20 illustrates an axial cross-sectional view of a cord lock assembly in an open position, according to an embodiment of the present invention.

FIG. 20 illustrates an axial cross-sectional view of the cord lock assembly 180 in an open position, according to an embodiment of the present invention. When the cord 124 is pulled, the cord passages 122 and 110 are aligned and the piston 104 moves out of contact with the lower portion 182 of the lanyard 118, thereby allowing the lower portion to straighten out. When the cord 124 is pulled, the lanyard 118 is tightened between the anchors 142 and exerts a force into a top projection 184 of the piston 104, thereby pushing the piston 104 downwardly in the direction of arrow B. In this way, the lanyard 118 may assist in releasing the locking pinch exerted on a draw cord.

In general, more or less anchors 142 may be used than those shown. Further, the anchors 142 may be positioned at different areas of the shell 102. Moreover, one or more of the anchors 142 may be directly connected to a portion of an article, such as the glove 90 shown in FIG. 11.

Figure 21:
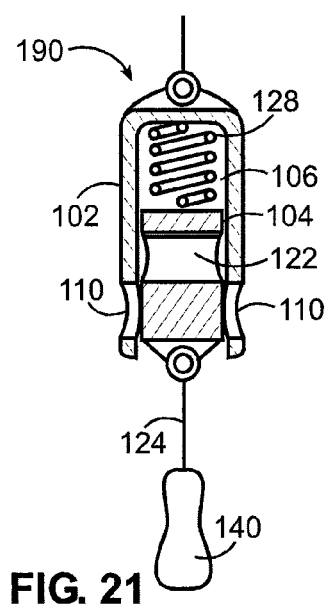
FIG. 21 illustrates an axial cross-sectional view of a cord lock assembly, according to an embodiment of the present invention.

FIG. 21 illustrates an axial cross-sectional view of a cord lock assembly 190, according to an embodiment of the present invention. In this embodiment, the spring 128 is secured to an underside of a closed end wall 192 of the shell 102. No end cap is used in this embodiment. Instead, a top surface of the piston 104 is secured to an end of the spring 128, which suspends the piston 104 within the internal chamber 106. The force constant of the spring 128 is such to ensure that the cord passage 122 of the piston 104 is above the cord passages 110 of the shell 102. In order to open the cord lock assembly 190, a user pulls the cord 124 to overcome the force suspending the piston 104. The user continues to pull until the cord passage 122 is aligned with the cord passages 110. When the grip tab 140 is released, the spring 128 pulls the piston 104 back up to its original position.

Figures 22, 23:
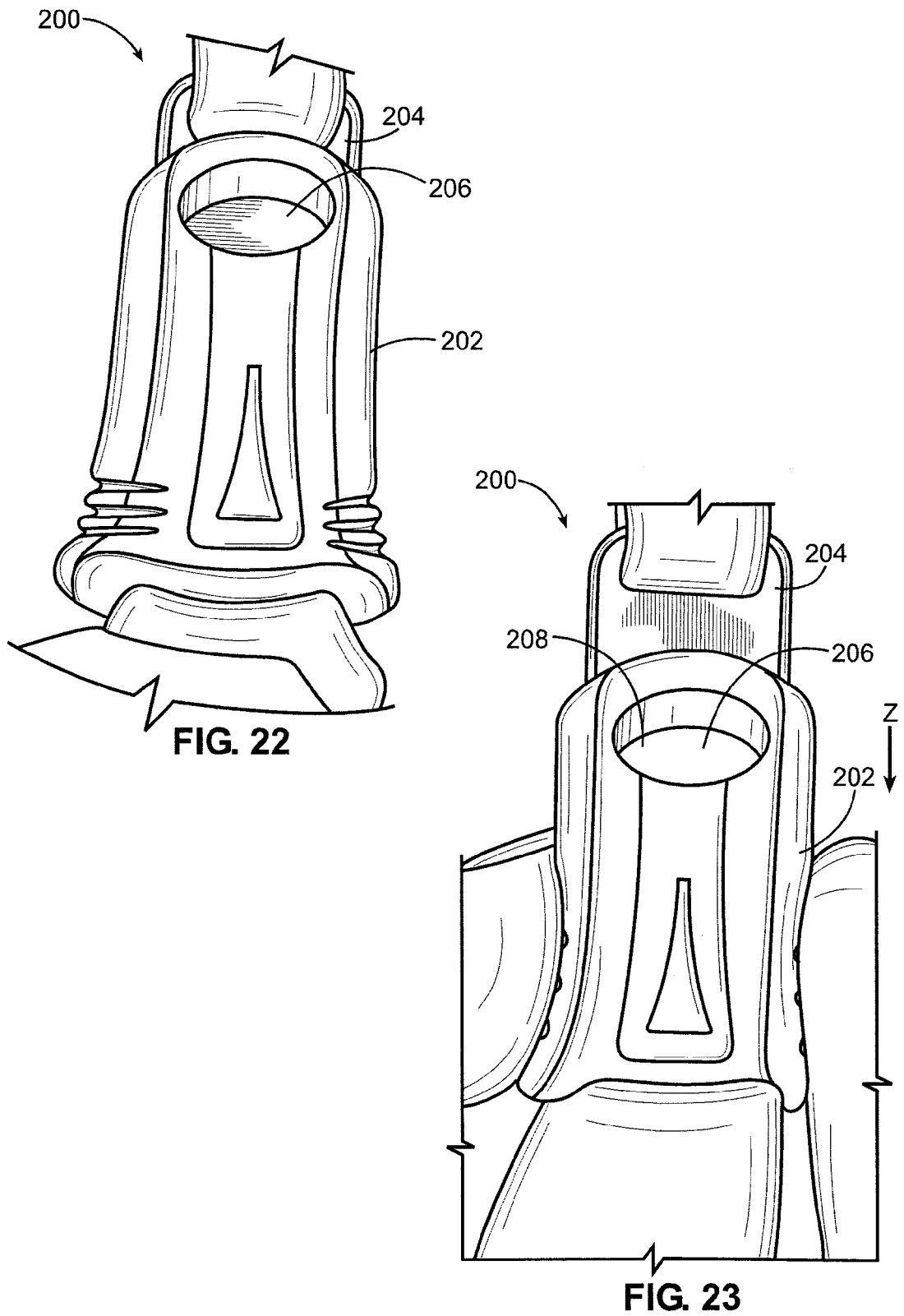
FIG. 22 illustrates an isometric view of a cord lock assembly in a closed position, according to an embodiment of the present invention.
FIG. 23 illustrates an isometric view of a cord lock assembly in an open position, according to an embodiment of the present invention.

FIG. 22 illustrates an isometric view of a cord lock assembly 200 in a closed position, according to an embodiment of the present invention. The cord lock assembly 200 includes a shell or main housing 202 that slidably retains a piston 204. Similar to the embodiments discussed above, the shell 202 included aligned passages 206 that are misaligned with a passage formed in through the piston 204 in the closed position. While the passages 206 are shown as holes, the passages 206 may, alternatively, be semi-circular/cylindrical open channels, grooves, divots, or the like. Instead of a pull cord being directly attached to a lower portion of the piston 204, a user may simply grasp the main housing 202 and pull it away from the piston 204 in order to aligned the passages 206 and the passage of the piston. Additionally, the surface of the cord lock assembly 200 may be smooth, instead of having ridges, indentations and the like.

While the shell 202 is shown having passages 206 that are generally holes, the top bar of the shell 202 may be removed. As such, the passages 206 may be semi-circular channels, instead of holes. Such an arrangement reduces the overall length of the shell 202 and reduces material costs.

FIG. 23 illustrates an isometric view of the cord lock assembly 200 in an open position, according to an embodiment of the present invention. As discussed above, a user may simply grasp the outside of the shell 202 and pull it down away from the piston 204, which is anchored to an article. In doing so, the passages 206 of the shell 202 align with the passage 208 formed through the piston 204. An internal spring member may be used to urge the shell 202 and piston 204 back into the closed position when the user releases the shell 202.

The embodiments described above may be formed of various materials, in various ways and sizes to handle different amounts of cord passages, cords and sizes of cords. The cord lock assemblies may be made of plastics, metals or any other suitable materials and the draw cords may be made of static cord, elastic cord, rope, cable, wire, tubing, webbing or the like depending on the purpose. The coil springs may be compression or expansion springs and made of metal, molded plastic, rubber, shock cord or any other suitable material. Embodiments of the present invention may be used with outdoor clothing, accessories, gear, equipment, packs, storage bags, footwear and various other items.

As shown and described, embodiments of the present invention provide a convenient and efficient cord lock assembly that takes advantage of opposing forces to allow an operator to selectively open and close the cord lock assembly with one hand. The grip tabs of the cords are much easier to locate and grip than squeezable areas on prior cord locks. That is, an operator can easily identify the cords and easily and firmly grasp the grip tabs. As such, a relatively high amount of force may be used to pull the cords in order to align the cord passages, as opposed to squeezing small areas together. By eliminating squeezing surfaces on the cord lock assembly, the cord lock assembly may be formed to be only as large as necessary to allow it function properly (as opposed to forming over-sized portions for grasping). Thus, the embodiments of the present invention may be compact and rounded to minimize intrusiveness.

Embodiments of the present invention provide a cord lock assembly that may be operated with one hand. Embodiments of the present invention provide a cord lock assembly that reduces the pinching force of the cord lock on the draw cord during tightening, and provides a release mechanism that releases the pinch on the draw cord and spreads the opening during loosening. Further, embodiments of the present invention provide a cord lock assembly that may have a compact, rounded shape that is easy to feel, grip, grasp and manipulate even while wearing gloves or mittens.

The amount of biasing force of a spring that may be overcome by squeezing with fingertips, as in prior cord locks, is generally limited. Embodiments of the present invention provide cord lock assemblies that are configured to be pulled in order to adjust. More force may be applied through pulling as opposed to squeezing. Embodiments of the present invention provide cord lock assemblies that may be robust and easy to grasp and adjust through pulling. These cord lock assemblies may be formed of stronger plastics or metals for even heavier applications with ropes or straps because the ability to grasp through pulling allows the user to adjust the cord lock assemblies with less effort than with prior squeeze style cord locks.

While various spatial and directional terms, such as top, bottom, lower, mid, lateral, horizontal, vertical, front and the like may used to describe embodiments of the present invention, it is understood that such terms are merely used with respect to the orientations shown in the Figures. The orientations may be inverted, rotated, or otherwise changed, such that an upper portion is a lower portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A cord lock assembly configured to selectively tighten and loosen a draw cord of an article, the cord lock assembly comprising:
   a shell defining an interior chamber, said shell comprising aligned shell cord surfaces;
   a piston slidably retained within said interior chamber, said piston comprising a piston cord passage formed therethrough;
   a spring member that exerts a biasing force into said piston within said shell so that said piston cord passage is misaligned with respect to said shell cord surfaces in a locked position, wherein said shell is configured to be pulled via a pulling action with respect to said piston, or vice versa, to compress said spring member so as to align said piston cord passage with said shell cord surfaces in an unlocked position so that a draw cord may freely pass therethrough, wherein upon release of the pulling action, the biasing force of said spring member causes said piston to move back to said locked position; and at least one anchor configured to securely retain a portion of material that is secured to the article.

2. The cord lock assembly of claim 1, wherein one of said shell or said piston is configured to be directly grasped and manipulated in order to pull said shell with respect to said piston, or vice versa.

3. The cord lock assembly of claim 1, comprising an end cap snapably secured to said shell, wherein said piston is trapped between said shell and said end cap, and wherein said end cap comprises an opening.

4. The cord lock assembly of claim 1, wherein said at least one anchor is aligned over at least one of said shell cord surfaces.

5. The cord lock assembly of claim 1, wherein said shell comprises an open end and a closed end.

6. The cord lock assembly of claim 1, wherein said shell comprises first and second open ends, wherein a flexible lanyard is anchored over one of said first and second open ends, said flexible lanyard limiting the movement of said piston.

7. The cord lock assembly of claim 1, wherein said spring member biases said piston into a closed end of said shell in the locked position.

8. The cord lock assembly of claim 1, wherein said spring member suspends said piston within said interior chamber in the locked position.

9. The cord lock assembly of claim 1, comprising a cord operatively secured to said piston, said cord being configured to be pulled to move said piston to align said piston cord passage with said shell cord surfaces in the unlocked position so that the draw cord may freely pass therethrough.

10. The cord lock assembly of claim 9, wherein said cord is configured to be grasped by one hand to move said piston cord passage and said shell cord surfaces into the unlocked position.

11. The cord lock assembly of claim 9, wherein a distal end of said cord is connected to a distinct grip tab that is discernable through touch.

12. A system for selectively opening and closing an article, the system comprising:
   a draw cord secured proximate an opening of the article;
   a cord lock assembly configured to selectively tighten and loosen the draw cord of an article, the cord lock assembly comprising:
      a shell defining an interior chamber, said shell comprising aligned shell cord passages;
      a piston slidably retained within said interior chamber, said piston comprising a piston cord passage formed therethrough, wherein a portion of said draw cord is retained within said shell cord passages and said piston cord passage;
      a spring member that exerts a force into said piston within said shell so that said piston cord passage is misaligned with respect to said shell cord passages in a locked position, wherein said draw cord is secured in place in the locked position, and
      wherein said shell is configured to be pulled relative to said piston to align said piston cord passage with said shell cord passages in an unlocked position so that said draw cord may freely pass therethrough, said system further comprising:
   a cord operatively secured to said piston, said cord being configured to be pulled to move said piston to align said piston cord passage with said shell cord passages in the unlocked position so that said draw cord may freely pass therethrough, wherein a distal end of said cord is connected to a first grip tab that is discernable through touch.

13. The system of claim 12, wherein said shell is configured to be directly grasped and manipulated in order to pull said shell relative to said piston.

14. The system of claim 12, wherein said cord is configured to be grasped by one hand to move said piston cord passage and said shell cord passages into the unlocked position.

15. The system of claim 12, wherein said draw cord is connected to a second grip tab that is separate and distinct from said first grip tab, wherein said first and second grip tabs differs in one or both of size and/or shape.

16. The system of claim 12, wherein said cord lock assembly comprises an end cap snapably secured to said shell, wherein said piston is trapped between said shell and said end cap, and wherein said end cap comprises an opening through which said cord passes.

17. The system of claim 12, wherein said shell comprises an open end and a closed end.

18. The system of claim 12, wherein said shell comprises first and second open ends, wherein a flexible lanyard is anchored over one of said first and second open ends, said flexible lanyard limiting the movement of said piston.

19. The system of claim 12, wherein said spring member biases said piston into a closed end of said shell in the locked position.

20. The system of claim 12, wherein said spring member suspends said piston within said interior chamber in the locked position.

21. The system of claim 12, wherein said cord lock assembly comprises at least one anchor configured to securely retain a lanyard that is secured to the article.

22. The system of claim 21, wherein said at least one anchor is aligned over at least one of said shell cord passages that is distally located from the article.

23. A cord lock assembly comprising:
   a shell defining an interior chamber and having an oval circumference, said shell comprising aligned shell cord passages;
   a piston slidably retained within said interior chamber, said piston having an oval cross-section and comprising a piston cord passage formed therethrough;
   a spring member that exerts a force into said piston within said shell so that said piston cord passage is misaligned with respect to said shell cord passages in a locked position;
   a cord operatively secured to said piston, said cord being configured to be pulled to move said piston to align said piston cord passage with said shell cord passages in an unlocked position so that a draw cord may freely pass therethrough, wherein said cord is configured to be grasped by one hand to move said piston cord passage and said shell cord passages into the unlocked position;
   a distinct grip tab connected to a distal end of said cord, said grip tab being discernable through touch;
   at least one anchor configured to securely connect said shell to an article; and
   a lanyard secured to said at least one anchor, said lanyard being configured to securely connect to the article.

24. The cord lock assembly of claim 23, comprising an end cap snapably secured to said shell, wherein said piston is trapped between said shell and said end cap, and wherein said end cap comprises an opening through which said cord passes.

25. The cord lock assembly of claim 23, wherein said at least one anchor is aligned over at least one of said shell cord passages that is distally located from the article.

26. The cord lock assembly of claim 23, wherein said shell comprises an open end and a closed end.

27. The cord lock assembly of claim 23, wherein said shell comprises first and second open ends, wherein said lanyard is anchored over one of said first and second open ends, said lanyard limiting the movement of said piston.

28. The cord lock assembly of claim 23, wherein said spring member biases said piston into a closed end of said shell in the locked position.

29. The cord lock assembly of claim 23, wherein said spring member suspends said piston within said interior chamber in the locked position.

* * * * *